US012590912B2

(12) United States Patent
Holzner et al.

(10) Patent No.: US 12,590,912 B2
(45) Date of Patent: Mar. 31, 2026

(54) LABORATORY CRYSTALLOGRAPHIC X-RAY DIFFRACTION ANALYSIS SYSTEM

(71) Applicants: Carl Zeiss X-ray Microscopy, Inc., Dublin, CA (US); Xnovo Technology ApS, Koege (DK)

(72) Inventors: Christian Holzner, Wettringen (DE); Erik Mejdal Lauridsen, Haarlev (DK); Peter Reischig, Leicester (GB)

(73) Assignees: Carl Zeiss X-ray Microscopy, Inc., Dublin, CA (US); Xnovo Technology ApS, Koege (DK)

( * ) Notice: Subject to any disclaimer, the term of this patent is extended or adjusted under 35 U.S.C. 154(b) by 132 days.

(21) Appl. No.: 18/558,556

(22) PCT Filed: Jun. 16, 2022

(86) PCT No.: PCT/US2022/033771
§ 371 (c)(1),
(2) Date: Nov. 2, 2023

(87) PCT Pub. No.: WO2023/113862
PCT Pub. Date: Jun. 22, 2023

(65) Prior Publication Data
US 2024/0219328 A1 Jul. 4, 2024

Related U.S. Application Data

(60) Provisional application No. 63/211,300, filed on Jun. 16, 2021.

(51) Int. Cl.
*G01N 23/20091* (2018.01)
*G01N 23/20* (2018.01)
*G01N 23/20008* (2018.01)

(52) U.S. Cl.
CPC ....... *G01N 23/20091* (2013.01); *G01N 23/20* (2013.01); *G01N 23/20008* (2013.01); *G01N 2223/606* (2013.01)

(58) Field of Classification Search
CPC ............. G01N 23/20091; G01N 23/20; G01N 23/20008
See application file for complete search history.

(56) References Cited

U.S. PATENT DOCUMENTS 4,982,417 A 1/1991 Kopineck et al.
7,796,726 B1 * 9/2010 Gendreau .............. G01N 23/20
378/80
(Continued)

FOREIGN PATENT DOCUMENTS

NO 179538 B 7/1996
WO WO 2019006102 A1 1/2019
(Continued)

OTHER PUBLICATIONS

International Search Report and Written Opinion of the International Searching Authority, mailed on Oct. 18, 2023, from International Application No. PCT/US2022/033771, filed on Jun. 16, 2022. 26 pages.
(Continued)

*Primary Examiner* — Casey Bryant
(74) *Attorney, Agent, or Firm* — HoustonHogle LLP

(57) ABSTRACT

A method and system for three dimensional crystallographic grain orientation mapping for objects. In different examples, subbeams are used that interact with the object at different angles. Other options include rocking the object at different angles during a raster scan. Multiple scans can be performed including raster scanning and directed analysis. In addition, different apertures can be employed. In examples, a disper-
(Continued)

sive spectroscopy (EDS) detector is added to analysis the energy of the diffracted photons.

19 Claims, 10 Drawing Sheets

(56) References Cited

U.S. PATENT DOCUMENTS

| | | | |
|---|---|---|---|
| 7,978,821 B1 * | 7/2011 | Glavicic | G01N 23/203 |
| | | | 378/76 |
| 9,383,324 B2 | 7/2016 | Feser et al. | |
| 2007/0069128 A1 * | 3/2007 | Soeda | G01N 23/20 |
| | | | 250/311 |
| 2020/0386695 A1 | 12/2020 | Remacha et al. | |

FOREIGN PATENT DOCUMENTS

| | | | |
|---|---|---|---|
| WO | WO 2019064013 A1 | 4/2019 | |
| WO | WO 2020061695 A1 | 4/2020 | |

OTHER PUBLICATIONS

Ahl, S.R., "Elements of a Method for Multiscale Characterization of Recrystallization in Deformed Metals", Department of Physics, Technical University of Denmark, Feb. 2018. 143 pages.

Arnaud, A et al., "A laboratory transmission diffraction Laue setup to evaluate single-crystal quality", Journal of Applied Crystallography, vol. 53(4), 2020. 15 pages.

Chen, X. et al., "Quantitative microstructural imaging by scanning Laue x-ray micro-and nanodiffraction", MRS Bulletin, vol. 41(6), Jun. 2016. 445-453.

Lipetzky, K.G. et al., "Practical Application of X-Ray Diffraction Imaging", In Proceedings of 15th World Conference on Nondestructive Testing, Oct. 2000. 7 pages.

Lynch, P.A. et al., "A laboratory based system for Laue micro x-ray diffraction", Review of Scientific Instruments, vol. 78(2), Feb. 9, 2007. 10 pages.

McDonald, S.A. et al., "Tracking polycrystal evolution non-destructively in 3D by laboratory X-ray diffraction contrast tomography", Materials Characterization, vol. 172, Feb. 2021. 1-11.

"The MWL120 Real-Time Back-Reflection Laue Camera System from Multiwire Laboratories", Multiwire Laboratories Ltd., [https://multiwire.com/index.shtml]. 2018. 7 pages.

Noyan, I.C. et al., "Residual stress/strain analysis in thin films by X-ray diffraction", Critical Reviews in Solid State and Material Sciences, vol. 20(2), 1995. 125-177.

Reischig, P. et al., "Three-dimensional reconstruction of intragranular strain and orientation in polycrystals by near-field X-ray diffraction", Current Opinion in Solid State & Materials Science, 2020. 62 pages.

Thompson, L.R. et al., "X-ray-diffraction characterization of silicon-on-insulator films", Journal of Applied Physics, vol. 70(9), Nov. 1, 1991. 4760-4769.

Toda, H. et al., "Diffraction-amalgamated grain boundary tracking for mapping 3D crystallographic orientation and strain fields during plastic deformation", Acta Materialia, vol. 107, Feb. 12, 2016. 310-324.

Vigano, N. et al., "Reconstruction of local orientation in grains using a discrete representation of orientation space", J. Appl. Cryst. 47, 2014. 1826-1840.

International Preliminary Report on Patentability, mailed on Dec. 28, 2023, from International Application No. PCT/US2022/033771, filed on Jun. 16, 2022. 19 pages.

* cited by examiner

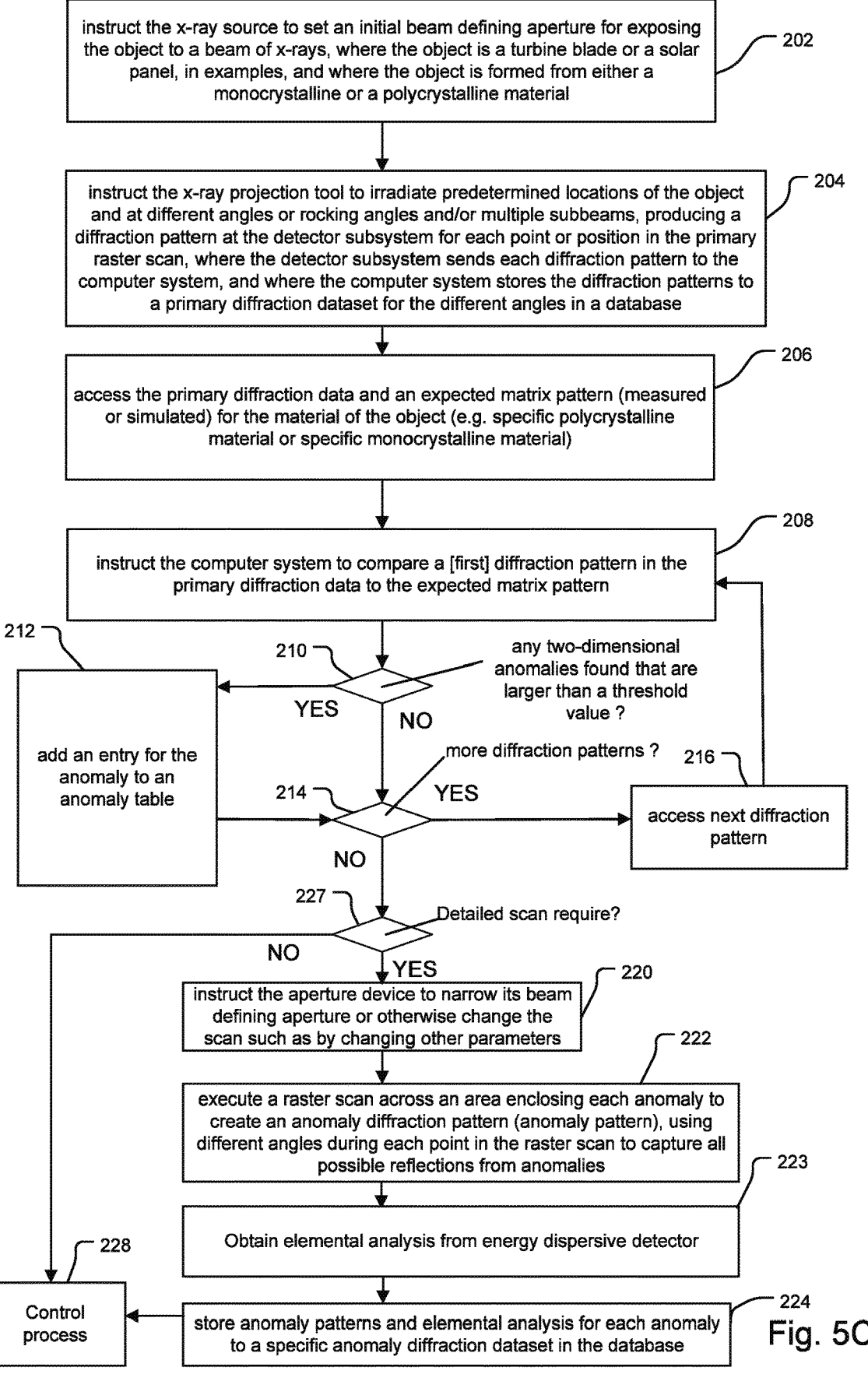

instruct the x-ray source to set an initial beam defining aperture for exposing the object to a beam of x-rays, where the object is a turbine blade or a solar panel, in examples, and where the object is formed from either a monocrystalline or a polycrystalline material — 202 instruct the x-ray projection tool to irradiate predetermined locations of the object and at different angles or rocking angles and/or multiple subbeams, producing a diffraction pattern at the detector subsystem for each point or position in the primary raster scan, where the detector subsystem sends each diffraction pattern to the computer system, and where the computer system stores the diffraction patterns to a primary diffraction dataset for the different angles in a database — 204 access the primary diffraction data and an expected matrix pattern (measured or simulated) for the material of the object (e.g. specific polycrystalline material or specific monocrystalline material) — 206 instruct the computer system to compare a [first] diffraction pattern in the primary diffraction data to the expected matrix pattern — 208

212 — add an entry for the anomaly to an anomaly table

210 — any two-dimensional anomalies found that are larger than a threshold value ?
YES    NO more diffraction patterns ?   216 — access next diffraction pattern
214 — YES
NO 227 — Detailed scan require?
NO    YES instruct the aperture device to narrow its beam defining aperture or otherwise change the scan such as by changing other parameters — 220 execute a raster scan across an area enclosing each anomaly to create an anomaly diffraction pattern (anomaly pattern), using different angles during each point in the raster scan to capture all possible reflections from anomalies — 222

Obtain elemental analysis from energy dispersive detector — 223

228 — Control process store anomaly patterns and elemental analysis for each anomaly to a specific anomaly diffraction dataset in the database — 224

Fig. 5C

LABORATORY CRYSTALLOGRAPHIC X-RAY DIFFRACTION ANALYSIS SYSTEM

RELATED APPLICATIONS

This application claims the benefit under 35 U.S.C. § 119(e) of U.S. Provisional Application No. 63/211,300, filed on Jun. 16, 2021, which is incorporated herein by reference in its entirety.

BACKGROUND OF THE INVENTION

Metallic, ceramic and semiconductor parts are often composed of many individual single crystal grains. And, many modern parts are specified to have specific crystallographic characteristics with respect to grain size, grain size distribution, single crystal and other grain characteristics for the respective applications for the materials. Moreover, the shape, size, distribution, location and/or orientation of the crystals may also be specified in order to achieve desired materials properties and thus the desired performance. Other material properties, typically characterized as anomalies, include voids, cracks, impurities, secondary grains, abnormal grains, orientation gradients, amorphous regions, and strained regions.

One specific example is directionally solidified superalloy turbine blades. With current technology, columnar-grain (CG) or single-crystal (SC) nickel-based alloy blades can be grown directionally (e.g. using Bridgman method). In many cases, the blades even have interior voids for cooling, being initially formed using additive manufacturing methods. In both columnar-grain and single-crystal turbine blade manufacture, careful control of crystallographic growth directions is critical for ensuring optimal strength, toughness and creep resistance. Problems, however, arise when some grains grow off-axis, or when nucleation of unwanted grains occur, decreasing the blade strength. In addition, crystalline changes can also arise during operation, which can lead to failure. Additional problems can arise at the boundaries of the grains.

Another example is semiconductor or ceramic single crystal substrates (e.g. synthetic diamond substrates for quantum computing). Controlling the growth process to achieve high quality single crystals is critical for the performance of the device. Problems, however, arise when anomalies (e.g. voids, impurities, secondary crystalline grains, crystallographic orientation gradients etc.) are formed during the growth process.

Another example is related to the fatigue performance of polycrystalline materials in e.g. aerospace parts. Here the presence of abnormally large grains can have detrimental impact of the fatigue life of the part.

As a consequence, electron backscatter diffraction imaging (EBSD) has been performed on the surface of polished cross-sections of materials in a scanning electron microscope to image grains and grain boundaries in two dimensions. The crystal orientation of grains is also determined in EBSD. Serial sectioning with a focused ion beam milling tool and EBSD imaging can yield three dimensional (3-D) EBSD data. 3-D EBSD is a destructive measurement technique since the object gets destroyed in the process, however.

Material evolution in the time domain as a function of external factors such as temperature cycling, stress and strain are extremely important to understand material failure and best processing conditions to yield materials with optimum properties. Since 3-D EBSD can only capture the grain map of an object once, it is very unsatisfactory to study material evolution.

Single composition poly-crystalline materials typically have no contrast to identify individual grains and boundaries in conventional x-ray tomography scans based on absorption and/or phase contrast. Nevertheless, x-ray diffraction contrast tomography (x-ray DCT) is a non-destructive approach for obtaining the 3-dimensional characterization of single— and polycrystalline microstructures. It allows the simultaneous mapping of the crystal grain shapes, grain orientation and microstructure of single- and polycrystals.

In the conventional x-ray DCT arrangement, the object is illuminated with a monochromatic beam of high energy synchrotron radiation. As the object is rotated and grains pass through the beam, the condition for Bragg diffraction gets fulfilled by individual grains, the resulting diffraction spots are recorded on a 2D detector placed behind the object. The diffraction geometry is used to assign spots to the grains from which the spots arose, and to determine the crystallographic orientations of grains. The spots are used as projections of the grains to reconstruct the respective grain shapes. The technique has been applied to several material science investigations, for example in the 3D characterization of grain boundary networks, and in-situ studies of inter-granular stress corrosion cracking in some stainless steels. Other materials investigated by x-ray DCT have included aluminum alloy Al 1050. Most importantly, it is now possible to perform routine 3-D grain map measurements non-destructively, which enables repetitive measurements to study time evolution.

SUMMARY OF THE INVENTION

The necessity to use synchrotron sources to perform these measurements is very limiting and a laboratory source diffraction CT system would close this gap. It is well known that synchrotrons generate x-rays with orders of magnitude of higher brightness than laboratory sources, and the methods for DCT developed for the synchrotron require high beam brightness, which manifests itself in high beam collimation and monochromaticity.

Laboratory sources generally have lower brightness compared to synchrotrons since they emit a very wide bandwidth of x-ray wavelengths in terms of Bremsstrahlung. Characteristic emission lines emitted in addition to the Bremsstrahlung background are low in intensity compared to total x-ray power emitted, and the use of a monochromator (crystal monochromator or multilayer) further reduces the intensity when trying to monochromatize the beam of a laboratory source.

The present invention concerns a system and method for analyzing objects of arbitrary shape and especially elongate parts, such as turbine blades.

The invention can be used to analyze objects as part of a production process. After manufacture, the crystalline structure of parts can be analyzed to validate, or not, the production processes. It can also be used in-line on the process. For example, the invention can be used to vary parameters associated with a casting, three-dimensional printing/additive manufacturing process, or other process such as an annealing step including the Bridgman method. In other cases, parts are analyzed as part of a maintenance cycle to determine whether the parts have been damaged or have deteriorated to the extent that replacement is required. In still other examples, the analysis of the parts is performed as part of a failure analysis to determine why a particular part broke or became damaged. In certain aspects, the invention relates to an evaluation method by first performing a quick scan of the parts to identify possible anomalies and then later performing more detailed analyses of the anomalies. Nevertheless, in other cases, one or the other is performed. That is, just detailed scans could be performed or only survey scans performed.

In some examples, these scans can be performed as raster scans while obtaining Laue diffraction patterns along with the related absorption images. This could be implemented in standard X-Ray scanners and/or computed tomography (CT) x-ray systems. The objective is to characterize the crystallographic properties such as grain size, grain size distribution, single crystal and other grain characteristics and including anomalies, such as voids, cracks, impurities, secondary grains, abnormal grains, orientation gradients, amorphous regions, and strained regions.

In general, according to one aspect, the invention features a method for crystallographic grain analysis. This method comprises performing a scan of the objects to identify possible anomalies; and then later performing more detailed analyses of the anomalies with a smaller beam aperture(s). This enables the more accurate characterization of the anomalies inside the object or the local crystallographic phase, orientation and/or other properties.

In general, according to another aspect, the invention features a method for crystallographic grain analysis. This method comprises performing a raster scan of the objects to identify possible anomalies; and then later performing more detailed analyses of the anomalies.

In general, according to another aspect, the invention features a method for crystallographic grain analysis. This method comprises scanning objects to identify possible anomalies with multiple subbeams that interact with the object at different angles simultaneously and analyzing resulting diffraction patterns to analyze the anomalies.

In general, according to another aspect, the invention features a method for crystallographic grain analysis comprising orienting objects to minimize a detector response, performing a scan of the objects to identify possible anomalies, and analyzing resulting diffraction patterns to analyze the anomalies.

Any of the forgoing methods can further include performing the scan of the objects at different angles and/or different rocking angles.

Any of the forgoing methods might also include performing the scan of the objects with multiple subbeams at different angles and/or different rocking angles and/or comparing detected diffraction patterns to expected diffraction patterns to identify anomalies.

In these methods a raster scan of the anomalies can be performed. Also an elemental analysis of the anomalies can be performed such as using a dispersive spectroscopy (EDS) detector.

Off-axis detector can be used for a wider diffraction angle coverage.

In general, according to another aspect, the invention features an x-ray diffraction analysis system comprising an x-ray source subsystem, object stage subsystem, a detector subsystem, and a computer system controlling the system to execute any of the foregoing methods.

In general, according to another aspect, the invention features a method for crystallographic grain analysis. This method comprises analyzing objects to identify possible anomalies and performing energy dispersive analysis of the identified anomalies.

In general, according to another aspect, the invention features a method for analyzing objects in which the method comprises performing a first crystallographic grain analysis of each of the objects, storing the results of the crystallographic grain analysis scan of each of the objects; then later performing a second crystallographic grain analysis of each of the objects. Finally, the results of the first crystallographic grain analysis and the second crystallographic grain analysis are compared to assess changes in each of the objects.

In embodiments, the first crystallographic grain analysis and/or the second crystallographic grain analysis can include scans of the objects at different angles and/or different rocking angles.

Also, the first crystallographic grain analysis and/or the second crystallographic grain analysis might include scans of the objects with multiple subbeams at different angles and/or different rocking angles and/or an elemental analysis.

In general, according to another aspect, the invention features an x-ray diffraction analysis system, comprises an x-ray source subsystem, an object stage subsystem, a detector subsystem, and a computer system controlling the system to execute the method.

The above and other features of the invention including various details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 5C is a flow diagram describing automated method for process control;

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

It will be understood that although terms such as "first" and "second" are used herein to describe various elements, these elements should not be limited by these terms. These terms are only used to distinguish one element from another element. Thus, an element discussed below could be termed a second element, and similarly, a second element may be termed a first element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
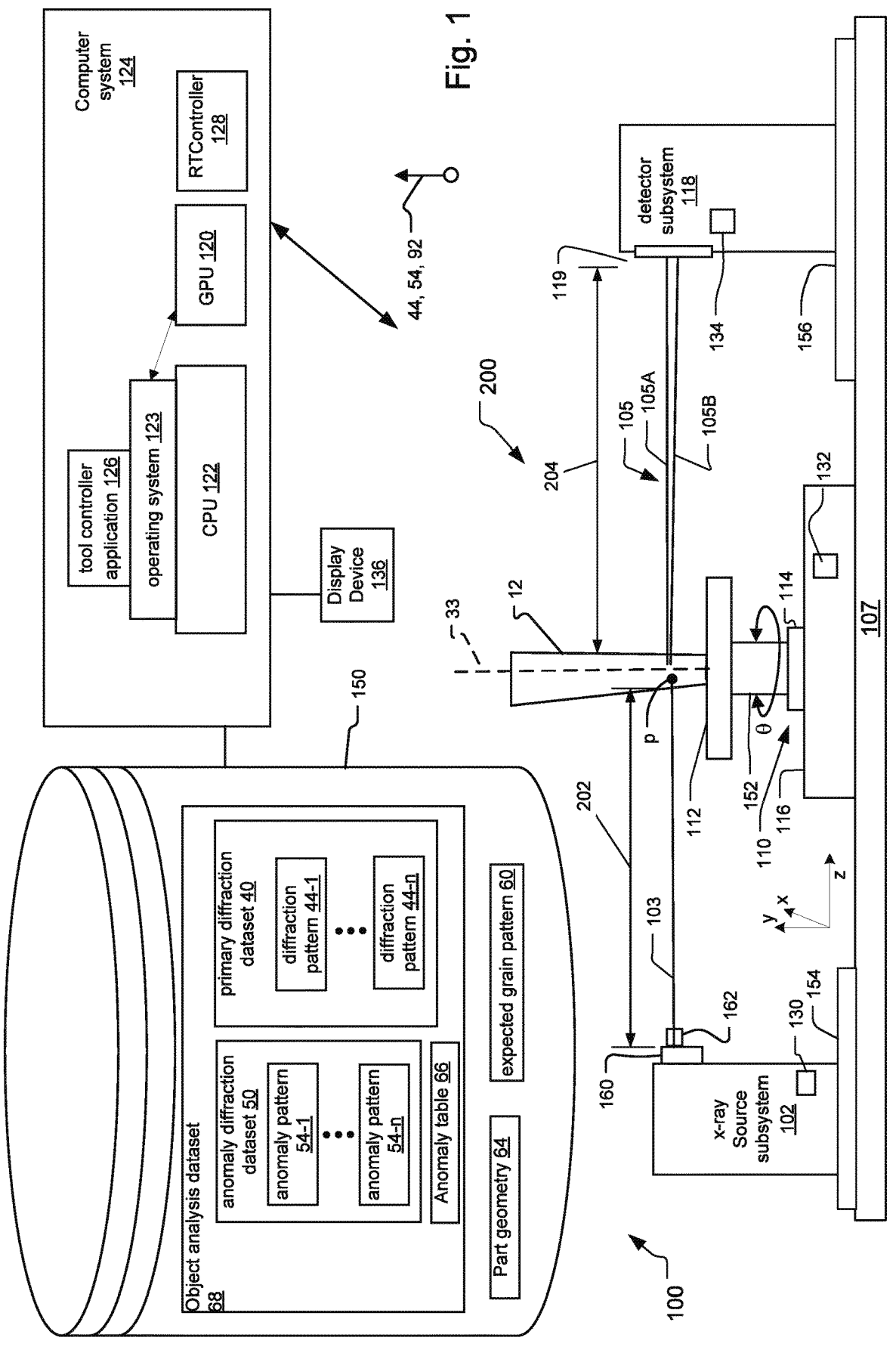
FIG. 1 is a schematic diagram of an x-ray diffraction analysis system according to the present invention.

FIG. 1 is a schematic diagram of an x-ray diffraction analysis system 100 that obtains and analyzes x-ray diffraction patterns of objects such as parts to resolve the crystallographic structure of the objects.

Here, a turbine blade 12 shown as an exemplary object.

Often the system 100 is used to analyze objects as part of a production process. After the turbine blades are manufactured, the crystalline structure of the parts is analyzed to validate, or not, the production processes.

However, in other examples, the objects are analyzed as part of a maintenance cycle to determine whether the objects have been damaged or have deteriorated to the extent that replacement is required. In still other examples, the analysis of the objects is performed as part of a failure analysis to determine why a particular part broke or became damaged.

In still other examples, the system is part of a production line for objects such as turbine blades. The system monitors and controls production processes such as the Bridgman method for controlling the growth of single crystal objects.

Major components of the x-ray projection, diffraction and composition analysis system 100 include an x-ray projection, diffraction, and composition tool 200, a computer system 124, and a database system 150.

The illustrated x-ray projection, diffraction, and composition tool 200 includes several subsystems. An X-ray source subsystem 102 generates a polychromatic or possibly monochromatic X-ray beam 103. An object stage subsystem 110 holds an object 12 in the beam and positions and repositions it to enable scanning by the positioning and repositioning of the object 12 in the stationary beam 103. A detector subsystem 118 detects the transmitted beam 105 after it has been modulated by the object. A base, such as a platform or optics table 107, provides a stable foundation for the tool 200 and its subsystems.

In general, the object stage subsystem 110 has the ability to position and rotate the object 12 in the incoming beam 103. Thus, the object stage subsystem 110 will typically include linear, rocking and rotation stages (e.g., goniometer). The illustrated example has a precision 3-axis stage 112 that translates and positions the object along the x, y, and z axes, very precisely. This allows the entire object 12 to be scanned within the beam 103. The 3-axis stage 112 is mounted on a theta stage 152 that rotates the object 12 in the beam around the y-axis 33.

Preferably, the object stage subsystem 110 provides up to 6 degrees of freedom or more so that the object 12 can additionally be oriented at different rocking angles in the beam. In one example, this is accomplished by adding a tip-tilt stage 114 between the theta stage 152 and the stage subsystem's base 116. The tip-tilt stage 114 tips the object 12 by rotating the object around the x-axis and also tilts the object 12 by rotating the object around the z-axis.

Often the tip/tilting is limited to a few degrees such as by less than less than +/−10 from vertical or even less than +/−5 degrees from vertical. In addition, the tip/tilt movement is typically performed in 1 or 2 degree steps. However, in other embodiments, a full rotation stage is used instead of the tip-tilt stage 114 enabling the full rotation of the object thus covering the entire orientation space, to avoid missing any reflections.

In another example, the object is held and manipulated in the beam 103 by a robot arm. In more detail, the 3-axis stage 112, theta stage 152, and tip-tilt stage 114 are replaced with a robotic arm such as a jointed robotic arm with a base rotation servo, a shoulder joint servo, an elbow joint servo, a wrist joint servo, and a rotary wrist servo.

The source subsystem 102 will typically be either a synchrotron x-ray radiation source or alternatively a "laboratory x-ray source" in some embodiments.

As used herein, a "laboratory x-ray source" is any suitable source of x-rays that is not a synchrotron x-ray radiation source. In many cases, the laboratory x-ray source is an x-ray tube device, in which electrons are accelerated in a vacuum by an electric field and shot into a target piece of metal or liquid metal jet, with x-rays being emitted as the electrons decelerate in the metal. Typically, such sources produce a continuous spectrum of background x-rays combined with sharp peaks in intensity at certain energies that derive from the characteristic lines of the selected target, depending on the type of metal target used. Furthermore, the x-ray beams are divergent and lack spatial and temporal coherence.

In one example, source subsystem 102 is a rotating anode type or microfocused source, with a Tungsten target. Targets that include Molybdenum, Gold, Platinum, Silver or Copper also can be employed, however. Preferably a transmission configuration is used in which the electron beam strikes the thin target from its backside. The x-rays emitted from the other side of the target are used as the beam 103.

The x-ray beam 103 generated by source subsystem 102 is often conditioned to suppress unwanted energies or wavelengths of radiation. For example, undesired wavelengths present in the beam are eliminated or attenuated, using, for instance, energy filters (designed to select a desired x-ray energy range) held in a filter wheel 160. Generally, x-ray filters only realize a high-pass behavior as it is not possible to filter out only high energies. Conditioning is also often provided by collimators or condensers for diverging beam as is often produced by a laboratory source.

An aperture device 162 is also provided to control the profile of the beam in the x, y plane. In some examples, the aperture device 162 provides a single aperture through which the x-rays pass. In other examples, the aperture device 162 includes several apertures or a regular or irregular one dimensional or two dimensional array of apertures. In any case, the size of the one or more apertures is preferably adjustable by the computer system. Typically, the apertures are dictated by two orthogonal slides that allow the beam width (size along the x-axis direction) and beam height size (along the y-axis direction) to be independently controlled. In other cases, the apertures are circular and an iris diaphragm mechanism is employed for diameter adjustability for each aperture. In still other examples, the entire aperture device 162 is swapped for another aperture device having the desired array geometry and aperture size.

When the object 12 is exposed to the incoming X-ray beam 103, the X-ray photons propagate through the object, forming a modulated transmitted beam 105 containing both an absorption image or direct beam and diffraction patterns formed by diffraction of the x-rays by the crystallographic structures in the object. The modulated transmitted beam 105, including the diffraction patterns 105A and the direct beam 105B, is received by the detector subsystem 118.

In one example, the detector system detects an absorption contrast image and refraction patterns and measures the energy of the transmitted x-ray photons allowing for elemental analysis.

Typically, the source subsystem 102 and the detector subsystem 118 are mounted on respective z-axis stages. For example, in the illustrated example, the source subsystem 102 is mounted to the base 107 via a source stage 154, and the detector subsystem 118 is mounted to the base 107 via a detector stage 156. In practice, the source stage 154 and the detector stage 156 are lower precision, high travel-range stages that allow the source subsystem 102 and the detector subsystem 118 to be moved into position to detect the desired diffraction patterns.

The operation of the tool 200 and the scanning of the object 12 is controlled by a computer subsystem 124 that often includes an image processor 120 and a real-time controller 128. In addition, a datastore such as a database system 150 is also provided. This can be manifest as disc or solid-state drives, and memory.

The computer system 124 includes one or more processors such as a central processing unit 122. The CPU 122 executes an operating system 123 and various applications run on that operating system 123 to allow for user control and operation of the x-ray tool 200. A display device 136 connected to the computer subsystem 124 displays information from the tool 200 such as absorption contrast images, diffraction patterns, composition information and locations of grain anomalies in the graphical user interface. User input devices are also common, such as a touch screen, computer mouse, and/or keyboard, which enable interaction between the operator and the computer subsystem 124.

The realtime controller 128 allows the computer subsystem 124 to control and manage components in the tool 200 under software control. This includes the x-ray source subsystem 102, the aperture device 162, the object stage subsystem 110, and detector subsystem 118. The controller 128 might be a separate computer system adapted to handle realtime operations or an application program executing on the CPU 122. The source subsystem 102 includes a control interface 130 allowing for its control and monitoring by the controller 128. Similarly, the object stage subsystem 110 and the detector subsystem 118 have respective control interfaces 132, 134 for allowing for their control and monitoring by the computer subsystem 124 via the controller 128.

To configure the tool 200 to scan the object 12 and to adjust other parameters such as the geometrical magnification, the operator utilizes the user interface rendered on the display device 136 to adjust the source-to-object distance 202 and the source-to-detector distance 204 by respective operation of the source stage 154 and detector stage 156 to achieve the desired scanning setup.

The system 100 operates under automatic control to operate the object stage subsystem 110 to perform scans, such as a raster scan, via computer subsystem 124, the controller 128, and the control interfaces 130, 132, 134. Optionally, the object stage subsystem 110 will position the object by rotating the object about an axis that is orthogonal to the optical axis of the x-ray beam 103 by controlling the theta stage 152 and/or position the object in the x, y, z axes directions. In addition, the stage subsystem 110 also dictates the tip and tilt via the tip-tilt stage 114. So the diffraction datasets are collected for different rocking angles.

The resulting information is stored to the database system 150. In general, the database system 150 stores information such as object analysis datasets 68. This can include the results of scan of objects so that the scans can be compared to later scans of the same objects. This information often further includes primary and anomaly diffraction datasets 40, 50 along with tables of the anomalies 66. In addition, the database system 150 include geometry information for objects under test such as solid models of those objects and expected grain patterns for those objects.

Figure 3:
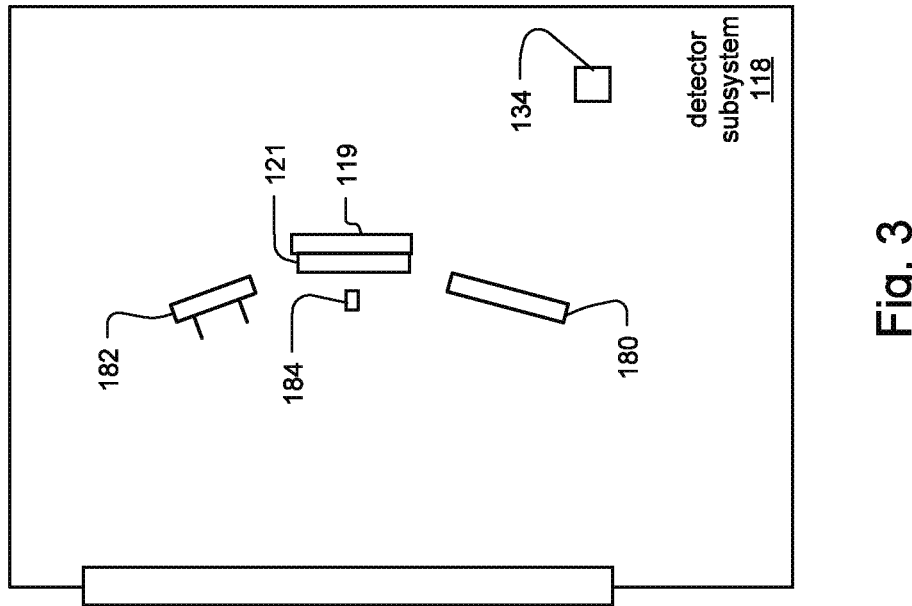
FIG. 3 is a schematic diagram of the detector subsystem according to one embodiment.

FIG. 3 shows one embodiment of the detector subsystem 118.

The detector subsystem 118 detects the diffraction patterns along with the projection absorption image of the object 12. In addition, in some embodiments, the detector subsystem further performs a spectral analysis to provide elemental information.

In one example, the detector subsystem includes a relatively low resolution detector 119, such as a panel detector. In general, the detector 119 is chosen to provide an optimal tradeoff between solid angle captured and detector size/resolution.

On other examples, the multiple detectors are used such as detector 119 and 180 to detect diffraction patterns at wider angles. In fact, multiple detectors could be arranged in a half dome or sphere. This setup captures more of the generated diffraction patterns.

In some embodiments the different detectors are located at various z-axis distances from the object in a serial acquisition manner. This includes having multiple detectors that acquire images and detect diffraction patterns at various z-axis positions and including specialized detectors (i.e. different characteristic) at various z-axis positions.

In some examples, a beam block 184 is provided to block the projection/absorption contrast image. Blocking the transmitted photons protects the dynamic range of the detector 119. Often the projection image is several times more intense than the diffraction patterns.

In a preferred embodiment, the beam block 184 is a neutral absorber or mask to lower the intensity of the projection/absorption image at the detection plane so that it has a similar intensity to the diffraction patterns. Thus, the detector 119 is capable of simultaneously detecting the diffraction patterns and the projection/absorption contrast image. In other cases, this is accomplished by using separate detectors for the diffraction patterns as opposed to the projection/absorption image.

For detecting the x-rays, the detector subsystem 118 often includes a scintillator 121, if required. On other cases, the detector 119 is capable of direct detection of the x-rays.

In one embodiment, the detector subsystem 118 further includes an energy dispersive spectroscopy (EDS) detector 182. The EDS x-ray detector measures the relative abundance of emitted x-rays and their energy. The EDS detector 182 can be a lithium-drifted silicon, solid-state device. Preferably a two-dimensionally spatially resolved device is used that has at least 100 by 100 pixels. When an incident x-ray strikes the detector, it creates a charge pulse that is analyzed to determine the spectrum of x-ray energy versus counts. This is then evaluated by the computer system 124 to assign x-ray energies to reflections/diffraction spots and determine the elemental composition of irradiated volume of the object 12.

By way of background with respect to EDS analysis, in a laboratory x-ray imaging system, there is commonly a wide bandwidth source (i.e. a spectrum of energies). And, the detector is not energy resolving. So when a diffraction spot is detected, more information is not available other than its extent at the detection plane.

According to Braggs diffraction law: n*\lambda=2*d*sin (\theta), which is a fulfilled condition for each diffraction spot. When detecting any diffraction spot, the unknowns are n (diffraction order), \lambda (wavelength, energy), d (crystallographic plane spacing), \theta (angle of diffraction). In addition, for a given diffraction spot, the x-ray energy of that spot is rather narrow; i.e. only a small fraction of the overall energy spectrum coming from the source is actually contributing to a given spot. In general, these parameters are what the indexing algorithm executing on computer system 124 determines as part of the object analysis. After a data set is successfully analyzed, each diffraction spot in each image has all these parameters determined, of course there can be uncertainties and inconsistencies in such complex data representations.

In this context, the energy resolving detector 182 provides distinct benefits for the diffraction indexing performed by the computer system 124. It allows to complete the indexing parts much faster and with fewer uncertainties/a higher degree of confidence in the correctness of the result of the indexing; instead having to determine lambda by an analysis, it is measured. The even more useful case is when two (or more) diffraction spots happen to overlap. With only the intensity based detector 119, the computer system 124 cannot always determine that there are spots overlapping (as the second spot could be rather faint or washed out from the more intense spot). With an energy resolving detector 182 and its analysis of the spot, the computer system 124 resolves that there are actually two (or more) distinct x-ray energies present (that differs by a significant large amount; as mentioned above the energy distribution within a spot is rather narrow).

For the particular example of the turbine blade imaging case, spot overlap is likely happening more frequently, as the diffraction spots from the sample matrix material will be rather large and extended and intense on the detector 119. If a smaller additional diffraction spot would fall into the same region on the detector 119 it might be missed; this is where an energy resolved signal from the energy resolving detector 182 will give a much distinct benefit.

Returning to FIG. 1, using the user interface rendered on the display device 136, the operator defines/selects scanning set ups. These include voltage settings that help to determine the X-ray energy spectrum and exposure time on the X-ray source subsystem 102. The operator also typically selects other settings such as the field of view of the X-ray beam 103 incident upon the object 12, and thus the number of x-ray diffraction patterns to create for the object 12. Generally, the scanning setup includes the angles to rotate and position the object by the stage subsystem 110. In addition, the source-to-object distance 202 and the source-to-detector distance 204 are often specified and these are converted to the necessary positions or settings for the source stage 154 and detector stage 156 as part of the scanning setup to obtain the desired patterns.

The computer subsystem 124, with the possible assistance of its image processor 120, accepts the set of diffraction patterns and projections from the detector subsystem 118 associated with the positions of the object 12 to build up the scan.

In general, the x-ray system 100 operates as follows. The x-ray source 102 emits the beam of x-rays 103 through the one or more apertures of the aperture device 162.

The x-ray beam impinges upon the object at defined one or more locations based on the selected aperture device 162 and the motion stage's positioning of the object 12.

These x-rays are absorbed and diffracted by the crystal or crystals forming the material of the object 12 at those areas to form the transmitted beam 105.

The transmitted beam 105 includes both a diffraction information created by grains or the entire sample matrix (in case of a single crystal object) optionally and/or additional absorption information. Then, a spatially resolved detector 119 at the detector subsystem 118 detects the transmitted beam 105 and sends diffraction pattern to the computer system 124. This process is repeated for multiple points across the object 12.

In operation, diffraction scan/image is separate from the absorption image scan. The diffraction scan/image is performed with the apertures and beam stop in place. The aperture and beam stop are removed for the absorption image scan. Generally, an absorption scan is not required but is often useful to define a coordinate system on the object. This could also be done with a visible light camera, however, in other embodiments.

In the case of turbine blade analysis, they often have varying characteristics between different blades. The blades can be as short as a few centimeters in length, or as large as several meters in length depending on the type of turbine and the blades' location in the same turbine. The blades 12 also typically have complex curved surfaces and internal structures. These characteristics of the blades 12 pose challenges when using the system 100 to determine defects in the blades.

In one implementation, the x-ray system 100 overcomes the challenges associated with the size and shape of the turbine blade 12 during analysis of the blade 12 as follows. First, as shown in FIG. 1, the turbine blade 12 is first located on the motion stage 110 such that the major, longitudinal axis 33 of the blade extends in the y-axis direction. The turbine blade 12 is then secured to the motion stage 110. Then, the turbine blade 12 is exposed at various locations/ points across the entirety of the blade 12 by executing a primary raster scan across the blade 12. This could be a coarse DCT scan with a large aperture.

The incoming beam preferably strikes surface normal with respect to exposed locations of the blade. This often yields the shortest path through the blade. But normal incidence is not a requirement per se. Possibly there could be benefits nevertheless in a normal incidence arrangement; one such advantage could be un-ambiguousness in data interpretation. To ensure this condition, the tool controller application 126 accesses part geometry information 64 contained in the storage 150. Often this part geometry information is a solid model or other three dimensional representation of the blade 12. The tool controller application 126 determines the local vector perpendicular to the tangent plane of the portion of the part's surface p that is exposed to the incoming beam 103 and then rotates and tilts the blade 12 so that the local perpendicular surface vector is parallel to the incoming beam 103 for the exposed area p. The solid model is used to optimize the scanning strategy.

The transmitted beam and the diffraction patterns contained in the beam 105 are detected by the detector subsystem 118 and read-out by the computer system 124. These patterns are the 2D Laue-diffraction images.

Then, the tool controller application steps the exposed area p to the next location in the raster scan of the part 12 and the part is again positioned for the surface normal condition for the exposed area p.

In some examples, the motion stage 110 is additionally moved in an angular "rocking" fashion by operation of the tip-tilt stage 114. Specifically, for each point, angular "rocking" of the motion stage 110 is implemented to capture all possible diffraction patterns.

Upon completion of the primary raster scan, the diffraction patterns 44 obtained for each point p of the blade are stored as a primary diffraction dataset 40 for the blade 12.

Then, the computer system 124 accesses the primary diffraction dataset 40 and determines whether crystalline anomalies exist in the turbine blade 12. This determination is based upon analysis of the diffraction patterns 44 and the desired crystalline structure expressed in the part geometry information 64 and the specified grain pattern information 60 associated with that location in the part. In one implementation, the computer system 124 determines whether anomalies exist by comparing an expected diffraction pattern for the turbine blade 12 to each detected pattern 44.

For each determined anomaly, the computer system 124 executes a directed scan upon the turbine blade 12. The directed scan is executed near the location/position of the blade 12 at which each anomaly was found in the primary diffraction data 40.

For each directed scan, the motion stage 110 is moved in a similar fashion as in the primary raster scan, and is additionally moved in an angular "rocking" fashion by operation of the tip-tilt stage 114. Specifically, for each point in the directed raster scan, angular "rocking" of the motion stage 110 is implemented to capture all possible diffraction patterns from anomalies.

For each point in the directed raster scan of each anomaly, a separate anomaly diffraction pattern (hereinafter known as anomaly pattern) is obtained. The anomaly patterns 54 for each anomaly are stored to a separate anomaly diffraction dataset 50. In the illustrated example, two anomaly diffraction datasets 54-1 to 54-$n$ are present, and were obtained for two anomalies found in the primary diffraction dataset 40.

In addition, during the directed scan, the EDS x-ray detector 182 is employed to detect the energy of the transmitted x-rays to enable the computer system 124 to determine the elemental composition of the anomalies.

In any event, in some embodiments, a database maintained by the computer system stores the diffraction patterns generated by the specified beam characteristics and the object's orientation in the beam 103 for each object tested. Thus, those parts are then later retested under the same beam characteristics and orientations to determine any changes to the resulting diffraction pattern and thus changes in the objects' crystalline structure.

Figure 2:
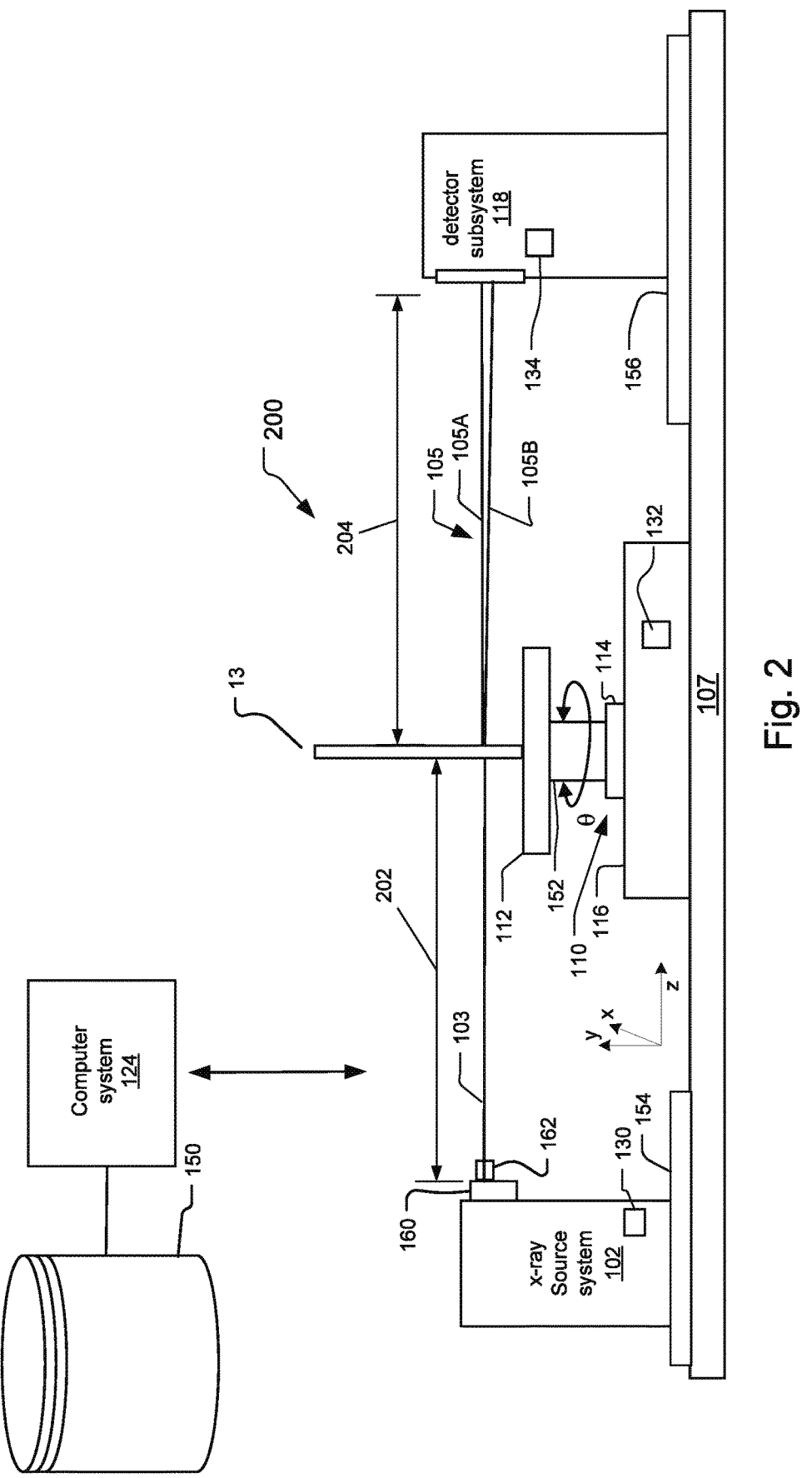
FIG. 2 is a schematic diagram of an x-ray projection and diffraction tool in which the object is a solar panel or semiconductor wafer material.

FIG. 2 is a schematic diagram of x-ray projection and diffraction tool 200 analyzing x-ray diffraction patterns of an object 12, which is a solar panel 13, shown from the side.

The system operates in a substantially similar way as described in connection with FIG. 1. Here, a primary diffraction dataset is obtained for the solar panel 13, and an anomaly diffraction dataset is obtained for single anomaly determined from the primary diffraction dataset.

Figure 4C:
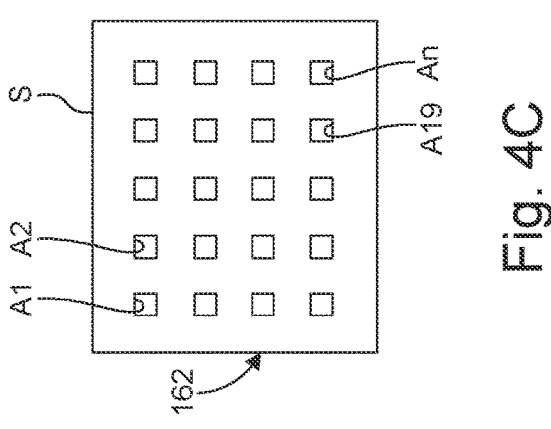
FIGS. 4A, 4B, and 4C shows different aperture devices
Figure 4B:
Figure 4B:
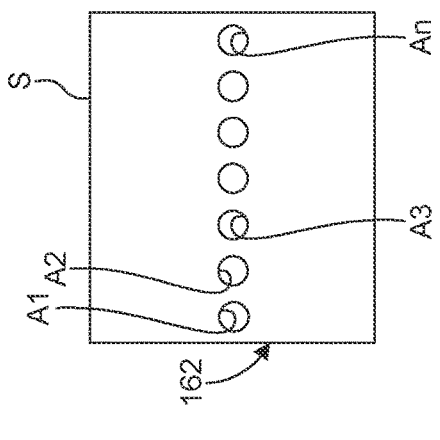
Figure 4D:
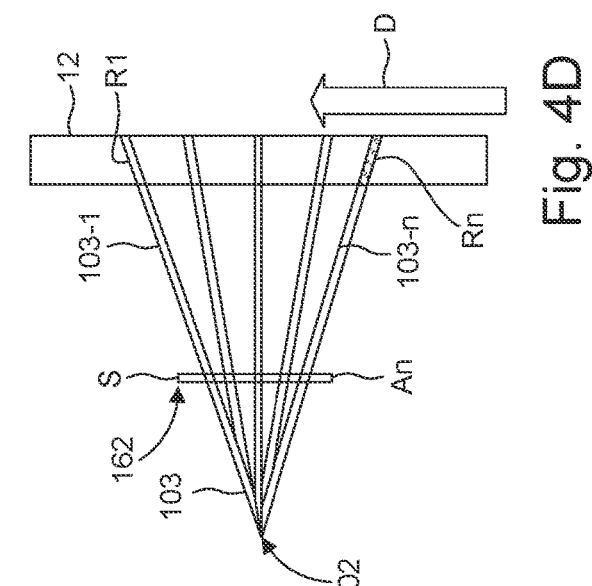
FIG. 4D shows how the different apertures of the aperture device cause the x-rays to interact with the object at different angles.
Figure 4A:
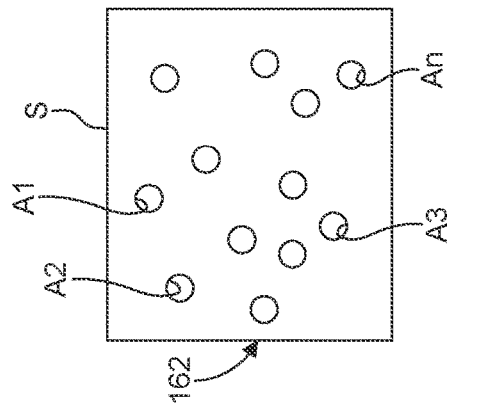

FIGS. 4A-4C shows exemplary aperture patterns provide by the aperture device 162.

In some embodiments, the aperture device 162 includes an arrangement of apertures to provide a multi-beam aperture setup.

In the embodiment of FIG. 4A, the aperture device 162 includes a beam blocking substrate S that absorbs the x-rays and a series of round apertures A1-An formed in the substrate S. Here the arrangement of apertures A1-An is random. Generally, the number of apertures is at least 4.

In the embodiment of FIG. 4B, the aperture device 162 includes round apertures A1-An in the substrate, which are arranged in a line to form a fan-beam.

In the embodiment of FIG. 4C, the aperture device 162 includes square apertures Al-An in the substrate S, which are arranged in a regular two dimensional array to form a grid beam.

In either of the embodiments shown in FIGS. 4A, 4B and 4C, multi beam stops are added in some examples. A beam stop is added in each aperture A1-An to be exactly aligned to block the direct beam footprint.

FIG. 4D is a schematic side view showing the effect of the multiple apertures.

The x-ray beam 103 emitted by the source 102 is divided into separate subbeams 103-1 to 103$n$ by the aperture device 162. Each individual aperture A1-An causes the illumination of a different localized region R1-Rn in the object 12. Due to the different angular relationships with incoming subbeams, the object 12 is illuminated at different angles. The resulting diffraction patterns associated with each aperture A1-An are then detected by the detector subsystem 118.

In some modes of operation, the object is translated in the direction of arrow D, perpendicular to the optical axis (object translation direction) and parallel to the line of apertures. Thus, each sample region or sub-volume R1-Rn will experience multiple different directional illuminations during the entire scan.

As a result, the combination of the multi-beam aperture device 162 with a raster-scanning approach results in each localized volumetric sample region R1-Rn to be illuminated multiple times with different incoming X-ray directions. This effectively removes the need for rocking of the object around the vertical axis—and thereby increases the acquisition speed. Assuming that the multi-beam aperture has a given minimum number of illumination points (P) with an angular collimation distribution. The new total data acquisition has N horizontal measurement positions and M vertical measurement positions. This means a speed up by a factor of W, where W typically will be in the range of 5-20 depending on the number of apertures. This assumes that the cone angle of the source beam is sufficiently large.

The speed up comes from the fact that when using a multi-beam aperture, each aperture corresponds to a unique angle. Thus using the multi-beam aperture removes (or reduces) the need for angular stepping of the sample.

The data processing then performed by the computer system 124 is slightly more complicated with P superimposed diffraction patterns per projection image, but this can be handled by using proper analytics of the resulting images (e.g. a forward-projection model).

In cases where the object under investigation exhibits orientation gradients (i.e. lattice curvature) and/or lattice strain the recorded diffraction spots will no longer be a simple projection of the illuminated localized sample region. In such cases the recorded diffraction spots will show streaking and complex redistribution of diffracted intensity carrying information of the underlying crystal quality in terms of lattice curvature and lattice strain.

This data acquisition strategy employing multiple apertures is combined with a modified version of Iterative Tensor Field (ITF) reconstruction, see Reischig & Ludwig, Three-dimensional reconstruction of intragranular strain and orientation in polycrystals by near-field X-ray diffraction, Current Opinion in Solid State & Materials Science, https://doi.org/10.1016/j.cossms.2020.100851; and/or Vigano, et al, J. "Reconstruction of local orientation in grains using a discrete representation of orientation space", Appl. Cryst. 47, 1826-40 (2014) dio: 10.1107/S1600576714020147. This allows for detailed information on the crystal quality (such as orientation gradients and lattice strains) to be derived from the measured diffraction signals.

Figure 5A:
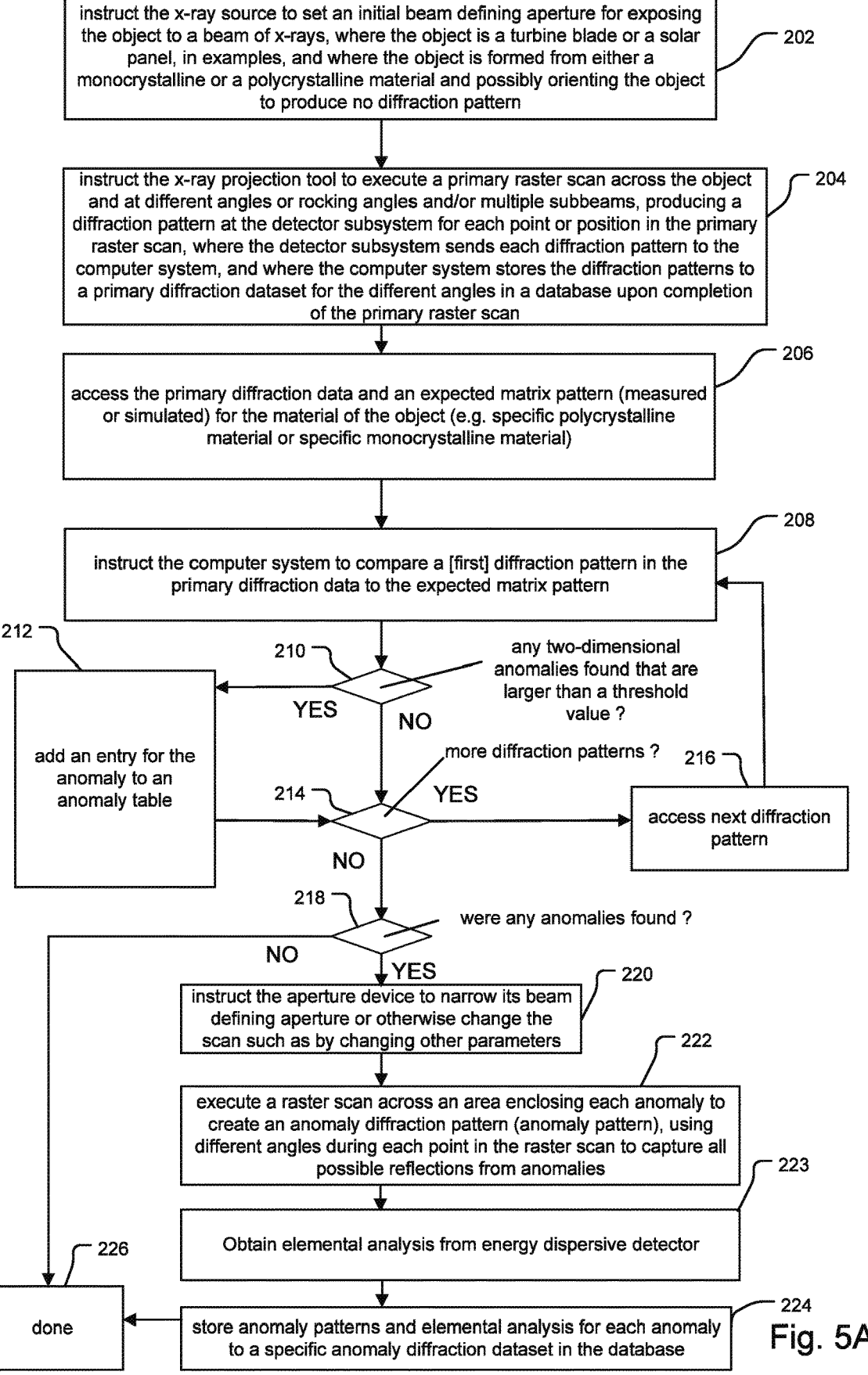
FIG. 5A is a flow diagram describing an automated method of operation for a computer system of the x-ray diffraction analysis system including orienting the object so that it will nominally produce no diffraction pattern, in one example.

FIG. 5A is a flow diagram that describes an automated method of operation for a computer system of the x-ray diffraction analysis system 100, where the method details how the computer system determines locations of crystalline anomalies within the object 12 based upon analyzing diffraction patterns obtained of the object.

Here, the entire method is executed in an automated fashion under the control of the computer system 124.

In step 202, the computer system 124 instructs the tool 200 to set an initial beam defining aperture or apertures among the different aperture setups provided by the aperture device 162 for exposing the object 12. Typically a larger aperture is selected for the primary raster scan. In other cases, multiple apertures are used as described in connection with FIGS. 4A-4D.

In some examples, the object, its geometry, and its specified crystalline characteristics and/or reference sample matrix are analyzed by the computer system 124. Then the computer system arranges the object in the beam such that no diffraction patterns should be detected by the detector subsystem 118 and detectors 119, 180. In one set up, the main matrix does not produce diffraction spots on the detector i.e. to be blind to the 00L direction (i.e. the matrix material).

In step 204, the computer system controls the tool to execute a primary raster scan across the object. The resulting diffraction patterns for each exposed point p are detected by the detector subsystem 118. The computer system 124 stores the diffraction patterns to a primary diffraction dataset 40 upon completion of the primary raster scan. Preferably, the stage 110 executes a "rocking" behavior for the object to search for any possible anomalies.

In step 206, the computer system 124 accesses the primary diffraction data 40 and an expected diffraction pattern 60 for the material of the object and the desired crystalline matrix at the exposed point (e.g. specific polycrystalline material or specific monocrystalline material).

In step 208, the computer system compares a primary diffraction data in the primary diffraction data to the expected diffraction pattern 60. If the differences suggest a possibly anomaly as determined in step 210, an entry is added for the possible site of an anomaly to an anomaly table 66 in step 212. This entry includes the location of the possible anomaly and the diffraction pattern of the possible anomaly.

In the case where the computer system arranges the object in the beam such that no diffraction patterns should be detected, then anomalies are easily determined when any pattern is detected by the detector subsystem 118.

The process then repeats through steps 214 and 216 until all the primary diffraction data is processed.

In step 220, the computer system 124 then instructs the tool to control the aperture device to apply a smaller aperture for the directed raster scan, than that used for the primary scan. This is done to more precisely determine anomaly's location on the object and its outline (the aperture size often should be then chosen to be smaller than the anomaly).

In step 222, the computer subsystem controls the tool 200 to execute a raster scan across an area bounding each anomaly referenced in the anomaly table 66. For each anomaly, the motion stage 110 is operated to collect diffraction patterns associated with the anomaly. The anomaly patterns 54 are stored in the anomaly diffraction data set 50. In some cases, the stage 110 executes a "rocking" behavior for each anomaly in the raster scan to capture all possible patterns from anomalies.

In addition, for each volumetric region(s) associated with each anomaly, the computer system also objects elemental information for those volumetric regions from the EDS detector 182, in step 223.

In some examples, the anomalies are determined by comparing the detected diffraction patterns to database with expected images or patterns for locations and involved geometries with expected patterns. These reference patterns are typically calculated based on the specified crystal structure at the location and the object's 3D structure. In addition, the quality of the crystals is preferably additionally assessed by characterizing streaking, etc. of the generated patterns.

In step 224, the computer system stores anomaly patterns and elemental analysis for each anomaly to a specific anomaly diffraction dataset 50 in the database 150. These steps are repeated for each entry in the anomaly table 66.

Figure 6:
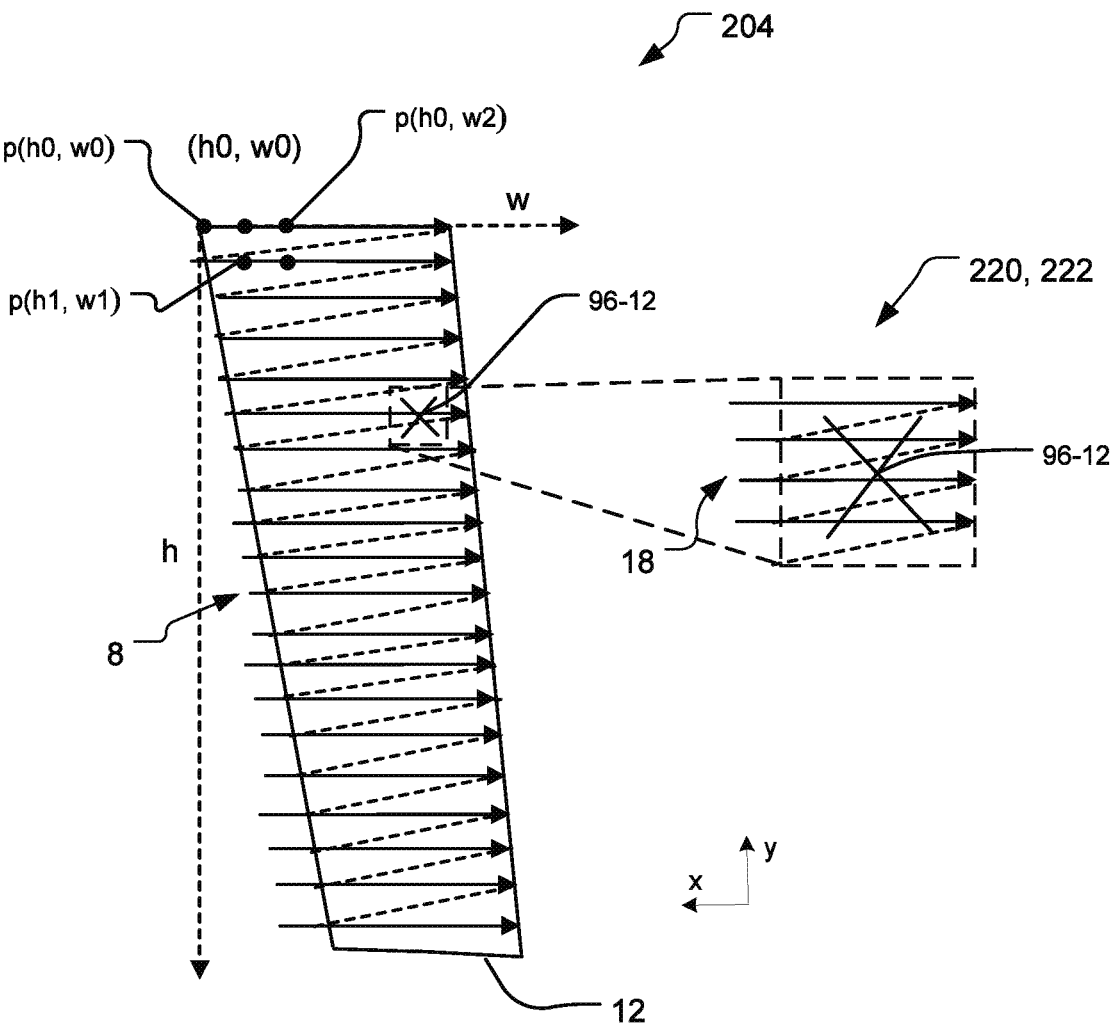
FIG. 6 schematically shows primary raster scanning of the turbine blade and the detailed directed scanning.

FIG. 6 schematically shows primary raster scanning of the turbine blade 12 in FIG. 1.

A primary raster scan 8 of the turbine blade 12 is shown. Corresponding steps in the method of FIG. 5A that implement the primary raster scan 8 are also indicated.

Exemplary points p of the turbine blade 12 that are exposed to the beam from the x-ray source 102 are shown. During the primary raster scan 8, the motion stage 110 is moved to an initial point p(h0, w0) that corresponds with an origin (h0, w0) of a coordinate system of the motion stage 110.

An anomaly 96-12 in the blade is shown.

Also shown schematically is the detailed directed raster scanning 18 of the anomaly 96-12 found in the blade 12 using a smaller aperture.

Figure 5B:
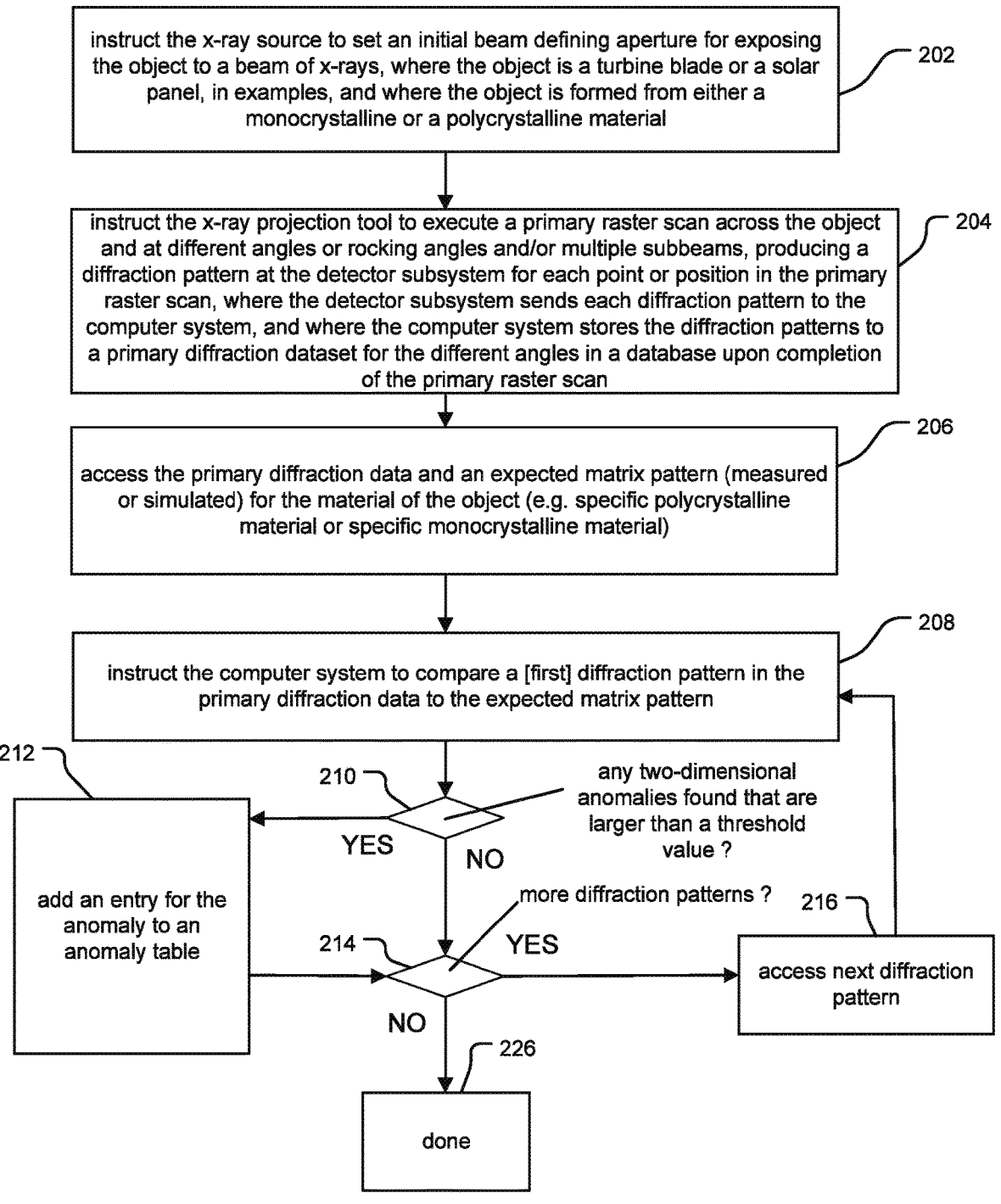
FIG. 5B is a flow diagram describing another automated simplified method of operation for a computer system of the x-ray diffraction analysis system.

FIG. 5B is a flow diagram that describes a simplified method of operation. Here, the detailed scan is not performed.

FIG. 5C is a flow diagram that describes a method of operation for process control. Here, the detailed scan is not performed.

In more detail, in step 227 it is determined whether a detailed scan is required. Such scan may not be required if the process can be controlled with relatively coarse information.

In any event, in step 228, the gathered information concerning the scanned object is used for feedback control of a process such as whether parameters of the process need to be changed or a process step, such as an annealing step, can be terminated or the part might be discarded.

Figure 5D:
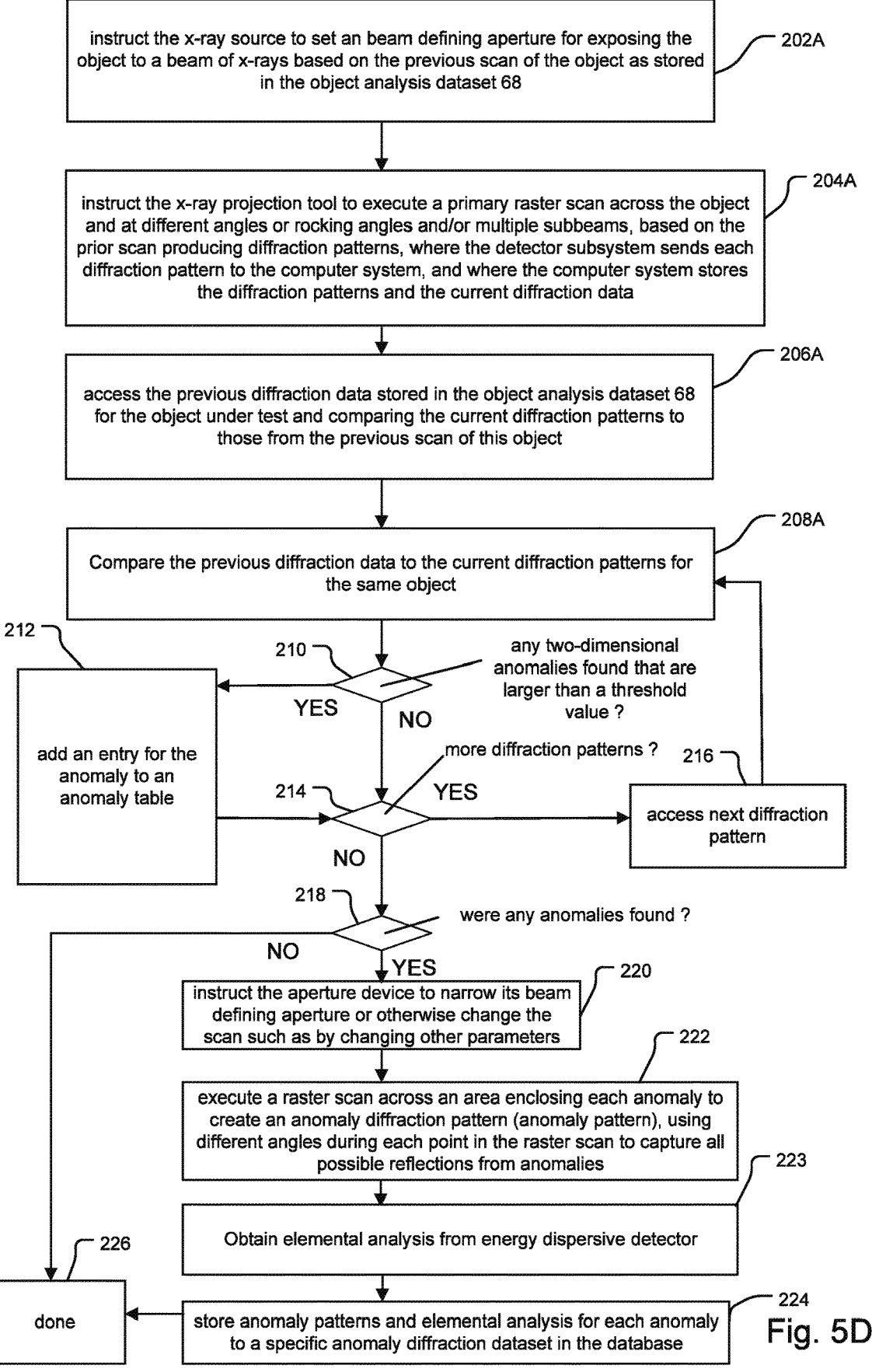
FIG. 5D is a flow diagram describing automated method for material evolution/failure analysis.

FIG. 5D is a flow diagram describing automated method for material evolution/failure analysis.

In step 202A, the computer system 124 instructs the tool 200 to set an initial beam defining aperture or apertures among the different aperture setups provided by the aperture device 162 for exposing the object 12. In this example, these set up parameters are chosen to be the same has were used during a previous analysis of the same part as stored in the object analysis dataset 68.

In step 204A, the computer system controls the tool to execute a primary raster scan across the object. The computer system 124 stores the diffraction patterns to a primary diffraction dataset 40 upon completion of the primary raster scan.

In step 206A, the computer system 124 accesses the previous diffraction data stored in the object analysis dataset 68 for the same object currently.

Then, step 208A, the computer system compares the previous diffraction data to the current diffraction patterns for the same object. Anomalies are declared when there is are detected changes suggesting evolution of the part's crystalline structure.

Figure 7A:
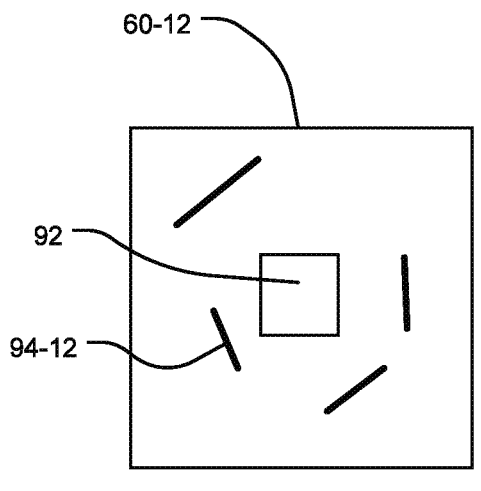
FIGS. 7A and 7B schematically show an expected and a detected diffraction pattern.
Figure 7B:
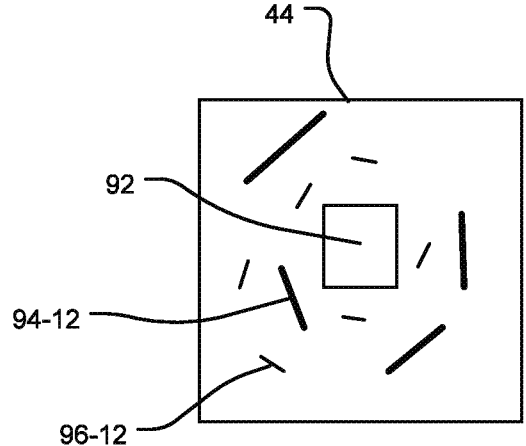

FIGS. 7A and 7B are 2-D diffraction patterns as recorded by the detector of the turbine blade 12 in FIG. 1 when the blade is formed from a monocrystalline material, where FIG. 7A is an expected matrix pattern of the turbine blade 12 that is used as a baseline or reference and stored in the expected grain pattern, and where FIG. 7B shows an actual diffraction pattern of the blade obtained by the x-ray system 100 of FIG. 1.

An absorption image 92 is in the center of both the expected matrix pattern 60-12 of FIG. 7A and in the exemplary diffraction pattern 44 of FIG. 7B. Matrix lines 94-12 in the expected matrix pattern 60-12 and in the exemplary diffraction pattern 44 are shown.

In general, unless the object (e.g. turbine blade 12) is rotated during the scanning, the diffraction patterns 44 obtained at different points/locations of the turbine blade 12 should be substantially similar to the expected matrix pattern 60-12 for the same material. Any variance here would come from significantly non-normal or strongly varying beam incidence direction on the object, in particular in case of involved object geometries. This is because of the monocrystalline structure of the turbine blade 12, where x-rays are diffracted in substantially the same way by the crystals of the blade 12 at each location. Specifically, the matrix lines 94-12 are located at substantially similar positions within the diffraction patterns 44 and the expected diffraction pattern 60-12, and have substantially similar sizes and/or widths.

While the turbine blade 12 formed from the monocrystalline material has very few impurities, some anomalies are nevertheless introduced into the monocrystalline material. The anomalies can be a different material, or simply be grains of the same monocrystalline material having different orientations than the majority of the crystals forming the blade 12.

When x-rays impinge upon grain boundaries between the monocrystalline material and each impurity, the diffraction pattern obtained at the detector subsystem 118 changes. Typically, additional anomalous lines 96-12 in the diffraction patterns 44 result.

In FIG. 7B, in more detail, the anomalies 96-12 are displayed in the diffraction pattern 44-1 as stray lines located at positions that do not match the positions of the (expected) matrix lines 94-12. In one example, the anomalies 96-12 are associated with locations in the turbine blade 12 where recrystallization has occurred.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for crystallographic grain analysis, the method comprising:
   performing a scan of objects with an x-ray beam to identify possible anomalies, wherein performing the scan comprises receiving, by a detector, x-ray diffraction patterns formed by diffraction of x-rays by crystallographic structures in the objects; and then later
   performing more detailed analyses of the anomalies with a smaller beam aperture relative to a beam aperture used in the scan,
   wherein identifying the anomalies comprises comparing detected diffraction patterns to expected diffraction patterns.

2. The method claimed in claim 1, further comprising performing the scan of the objects at different angles and/or different rocking angles.

3. The method claimed in claim 1, further comprising performing the scan of the objects with multiple subbeams at different angles and/or different rocking angles.

4. The method claimed in claim 1, further comprising performing a raster scan of the anomalies.

5. The method claimed in claim 1, further comprising assigning x-ray energies to reflections/diffraction spots and/or performing an elemental analysis of the anomalies.

6. The method claimed in claim 5, wherein the elemental analysis is performed using a dispersive spectroscopy (EDS) detector.

7. The method claimed in claim 1, further comprising employing an off-axis detector for a wider diffraction angle coverage.

8. An x-ray diffraction analysis system, comprising:
   an x-ray source subsystem;
   an object stage subsystem;
   a detector subsystem; and
   a computer system controlling the system to execute the method described in claim 1.

9. The system of claim 8, further comprising an aperture device containing one or more adjustable apertures.

10. The method of claim 1, further comprising, prior to performing the scan, orienting the objects to minimize a detector response.

11. The method of claim 10, wherein orienting the objects to minimize the detector response comprises orienting the objects in the x-ray beam so that no diffraction patterns are detected for a main matrix, and anomalies are determined when any diffraction pattern is detected for the main matrix.

12. The method of claim 1, wherein the scan comprises receiving a projection image containing an absorption image of the object or containing a camera image.

13. The method of claim 1, wherein the method is performed twice for a given object to assess changes in the given object.

14. The method of claim 1, wherein the scan of the objects includes scanning each of the objects with multiple subbeams that interact with the objects at different angles.

15. The method of claim 1, wherein the scan of the objects includes scanning each of the objects at different rocking angles relative to the x-ray beam.

16. The method of claim 1, wherein the scan of the objects further includes detecting the x-ray diffraction patterns additionally with an off-axis detector that provides a wider diffraction angle coverage.

17. The method of claim 1, further comprising:

performing a first crystallographic grain analysis of each of the objects based on the x-ray diffraction patterns;

storing the results of the first crystallographic grain analysis scan of each of the objects; then later performing a second crystallographic grain analysis of each of the objects after usage of the objects; and comparing the results of the first crystallographic grain analysis and the second crystallographic grain analysis to assess changes in each of the objects.

18. The method claimed in claim 17, wherein the first crystallographic grain analysis and the second crystallographic grain analysis include performing an elemental analysis using a dispersive spectroscopy (EDS) detector.

19. The method of claim 1, wherein the objects include a turbine blade or a solar panel.

* * * * *